United States Patent Office 3,606,871
Patented Sept. 21, 1971

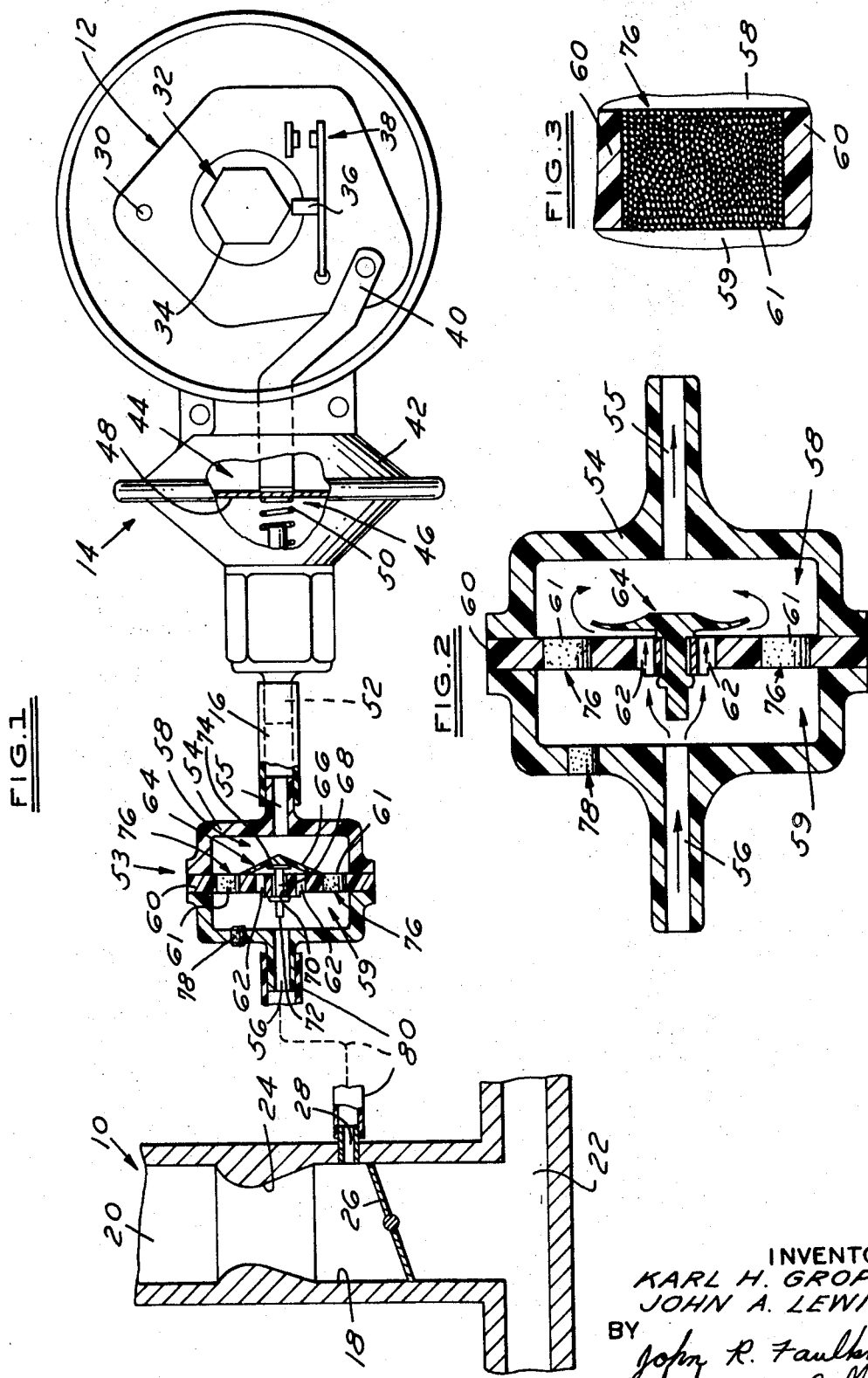

3,606,871
ENGINE SPARK TIMING CONTROL DEVICE
Karl H. Gropp, Grosse Pointe Woods, and John A. Lewis, Detroit, Mich., assignors to Ford Motor Company, Dearborn, Mich.
Filed July 6, 1970, Ser. No. 52,325
Int. Cl. F02p 5/06
U.S. Cl. 123—117A
4 Claims

ABSTRACT OF THE DISCLOSURE

An internal combustion engine has a vacuum servo connected to the distributor breaker plate for moving it as a function of the change in carburetor spark port vacuum as controlled by a mechanical device between the servo and spark port having sintered metal flow restriction and a one-way check valve in parallel flow circuits, the check valve unseating during rapid vehicle accelerations to quickly reduce the spark advance setting to a lower level, for better performance, the sintered metal flow restriction providing a delayed rate of return to an advanced spark timing setting during relatively slower accelerations, to minimize the emission of undesirable exhaust gas elements.

This invention relates, in general, to a device that aids in the reduction of exhaust emission pollutants from an internal combustion engine. More specifically, it relates to a mechanical spark timing control device that automatically varies the spark timing setting in accordance with changing engine conditions to provide engine performance, and yet minimize the output of undesirable elements.

Most present day motor vehicles have some sort of a vacuum servo automatically controlling the advance or retard setting of the engine distributor breaker plate as a function of carburetor spark port vacuum to provide good engine performance as well as fuel economy during the different operating conditions of the engine. These vacuum servos, in their simplest forms, generally consist of a housing divided into atmospheric pressure and vacuum chambers by a flexible diaphragm connected to the distributor breaker plate. The diaphragm and breaker plate are normally spring biased to the lowest advance or retard spark timing setting, and carburetor spark port vacuum normally urges the diaphragm in a spark timing advance direction upon opening of the carburetor throttle valve in an engine speed increasing direction.

With the above construction, during rapid accelerations, the drop in vacuum at the carburetor spark port permits atmospheric pressure acting on the opposite side of the servo diaphragm to immediately move the distributor breaker plate to a lower advanced setting, to one that is best to meet engine performance requirements. On the other hand, however, upon return to normal operation and gradual reacceleration or deceleration of the engine, an increase in vacuum at the carburetor spark port causes an immediate return movement of the vacuum servo diaphragm to a higher engine spark timing advance setting. This provides a longer burning time for the fuel mixture before the optimum top or near top dead center position of the piston is attained, generally providing the most desirable operation. However, this longer time permits the buildup to higher combustion temperatures and pressures, which are undesirable insofar as the production of oxides of nitrogen and other undesirable elements are concerned.

It will be seen, therefore, that the conventional spark timing control systems generally provide good performance and fuel economy, but don't necessarily minimize the output of undesirable exhaust gas elements.

Therefore, it is a primary object of the invention to provide an engine spark timing device that has the advantages of the conventional spark timing control system while minimizing the disadvantages; by providing a device that delays the rate of change of spark timing advance during normal vehicle accelerations, to reduce the amount of exhaust gas emissions of undesirable elements, and yet permits a rapid change in the spark timing advance setting to a lower level upon sudden or rapid accelerations, for performance results.

It is another object of the invention to provide an engine spark timing control system including a device that meets the requirements set out immediately above, by including a flow restricting means in parallel flow with a one-way check valve.

Other objects, features and advantages of the invention will become more apparent upon reference to the succeeding detailed description thereof, and to the drawings illustrating a preferred embodiment thereof; wherein:

FIG. 1 illustrates schematically a cross-sectional view of an engine spark timing control apparatus embodying the invention; and FIG. 2 illustrates a portion of the FIG. 1 showing in a different operative position; and FIG. 3 is an enlarged view of a detail of FIGS. 1 and 2.

FIG. 1 shows, schematically, only those portions of an internal combustion engine that are normally associated with the engine distributor spark timing setting control; such as, for example, a carburetor 10, a distributor breaker plate 12, a vacuum servo 14 to control the movement of breaker plate 12, and a line 16 connected between the carburetor and vacuum servo to automatically change the engine spark timing setting as a function of changes in engine vacuum spark port setting.

More specifically, carburetor 10 is shown as being of the downdraft type having the usual air-fuel induction passage 18 with an atmospheric air inlet 20 at one end and connected to the engine intake manifold 22 at the opposite end. Passage 18 contains the usual fixed area venturi 24 and a throttle valve 26. The latter is rotatably mounted on a part of the carburetor body across passage 18 in a manner to control the flow of air-fuel mixture into the intake manifold. Fuel would be inducted in the usual manner from a nozzle, not shown, projecting into or adjacent venturi 24, in a known manner.

Throttle valve 26 is shown in its engine idle speed position essentially closing induction passage 18, and is rotatable to a nearly vertical position essentially unblocking passage 18. A spark port 28 is provided at a point just above the idle position of throttle valve 26, to be traversed by the throttle valve during its opening or part throttle movements. This will change the vacuum level in spark port 28 as a function of the rotative position of the throttle valve, the spark port reflecting essentially atmospheric pressure in the air inlet 20 upon closure of the throttle valve.

As stated previously, the distributor, not shown, includes a breaker plate 12 that is pivotally mounted at 30 on a stationary portion of the distributor, and movable with respect to cam 32. The latter has six peaks 34 corresponding to the number of engine cylinders, each cooperating with the follower 36 of a breaker point set 38 to make and break the spark connection in a known manner for each one-sixth, in this case, rotation of cam 32. Pivotal movement of breaker plate 12 in a counterclockwise spark retard setting direction, or in a clockwise spark advance setting, is provided by an actuator 40 slidably extending from vacuum servo 14.

Servo 14 may be of a conventional construction. It has a hollow housing 42 whose interior is divided into an atmospheric pressure chamber 44 and a vacuum chamber 46 by an annular flexible diaphragm 48. The diaphragm is fixedly secured to actuator 40, and is biased in a rightward retard direction by a compression spring 50. Chamber 44 has an atmospheric or ambient pressure vent, not shown, while the chamber 46 is connected by a bore 52 to line 16.

During engine-off and other operating conditions to be described, atmospheric pressure exists on both sides of the diaphragm 48, permitting spring 50 to force the actuator 40 to the lowest advance or a retard setting position. Application of vacuum to chamber 46 moves diaphragm 48 and actuator 40 toward the left to an engine spark timing advance position, by degree as a function of the change in vacuum level.

Turning now to the invention, the system includes a mechanical device 53 having an outer housing 54. The latter has a connection 55 at one end to line 16, and a connection 56 at the opposite end to carburetor spark port 28. Housing 54 is divided into two chambers 58 and 59 by an annular partition 60 having a number of radially spaced sets of circumferentially spaced apertures 61 and 62. The apertures 62 are adapted to be controlled by a flexible one-way check valve 64.

Check valve 64 consists of a flapper or umbrella type seal having a flexible membrane 66 secured on an axial stem 68. The stem projects through a central bore 70 in partition 58, and is fixed therein by means of spaced shoulders or flanges 72 and 74. Membrane 66 is responsive to the differential in pressures on opposite sides thereof to move alternately to the positions shown in FIGS. 1 and 2. In FIG. 1, the pressure level in the chamber 58 is greater than in the left hand chamber 59. In the open position shown in FIG. 2, the membrane 66 is flexed outwardly when the pressure level in chamber 59 is greater than in chamber 58, to permit a free communication through holes 62 between chambers.

Holes 61 contain sintered metal plugs 76 that each consist of randomly oriented and dispersed multitudes of minute metal particles compacted together under pressure into discs and passed through a furnace to bond the particles to each other. This defines a multitude of labyrinthine type fluid passages connecting the voids between particles, and provides an extremely close tolerance flow restrictor or orifice. The particles may be balls, or free shaped bent plate particles, for example. Their size will control the flow restriction.

An actual conventional orifice of such a small flow capacity could not feasibly be made under production conditions. Such a small size orifice made in a conventional manner by providing merely a reduced diameter passage could easily be plugged by a small piece of dirt, whereas dust and grease will not clog up a sintered metal orifice of this type because of the multitude of differently oriented flow passages. The sintered metal plugs, therefore, constitute a flow restricting means that delays the communication between opposite sides of partition member 58 when the check valve 64 is closed.

To complete the construction, the wall of housing 54 contains an atmospheric or ambient pressure air bleed consisting of a sintererd metal plug 78. The latter is similar in construction to plugs 76, but of a larger flow area; i.e., less restriction. The air bleed assures a flow through the line 80 at all times, when the throttle valve is open, in a direction from the chamber 59 to spark port 28, to prevent fuel leakage from the carburetor entering line 80 and contaminating the check valve membrane 66 or servo diaphragm 48. That is, during part throttle operation, the vacuum in line 80 pulls air through the bleed 78 at the same time flow is through the sintered plugs 76, since chamber 58 is at a higher absolute pressure level. Flow through the bleed 78 does not appreciably affect the flow through plugs 76, however, since the engine has an air flow capacity far in excess of what normally flows through the sintered plugs 76 alone. Therefore, any fuel that might tend to leak into line 80 is purged by the air flow from bleed 78.

During closed throttle operation, no fuel is inducted from the main system, and the idle flow passage generally is below the throttle valve, so no fuel leakage problem generally exists at this time.

In operation of the system, in engine-off, as well as engine idle speed and deceleration conditions, engine spark port 28 will be at atmospheric pressure, as will both chambers 44 and 46 of the servo 14. Therefore, the distributor breaker plate 12 will be placed in its lowest engine spark timing advance or a retard position by servo spring 50.

During part throttle engine operations, during normal depression of the vehicle accelerator pedal, not shown, rotation of throttle valve 26 will communicate the vacuum in manifold 22 to spark port 28 so that the left hand chamber 59 of device 53 will be at a pressure level lower than chamber 58. Since check valve 64 is already seated, equilization of pressures between the two chambers will be had only through the sintered metal orifices 76. Thus, only a slow buildup in vacuum will be transmitted to the vacuum servo chamber 46, resulting in only a slow change in the vacuum advance setting of the distributor breaker plate 12.

As stated previously, this is a slower response than the conventional engine spark timing control systems, and results in a lower advance setitng than conventional for the same vacuum level in spark port 28, thereby producing lower peak combustion temperatures and pressures. The delayed ignition also causes the mixture to continue burning into the exhaust system and thereby provides more complete combustion. The end result is a lower output of undesirable engine exhaust elements.

If the engine throttle valve is suddenly moved toward a wide open throttle position, or rapid acceleration condition of operation, the sudden decay in vacuum in the engine intake manifold 22 is communicated immediately through spark port 28 to the left hand chamber 59 of device 53. The vacuum level in line 16, however, has been at the vacuum level previously attained at spark port 28, and, therefore, is at a lower absolute pressure than the left hand chamber 59. This immediately unseats the flapper or check valve 64 and allows a quick equalization of the pressures on opposite sides of partition 58 of device 53 through the inner holes 60. Accordingly, the immediate change in vacuum level in spark port 28 is quickly communicated to the servo chamber 46, and the breaker plate 12 is immediately pivoted to a lower advance setting more appropriate to an accelerating condition of operation.

As soon as equalization occurs, the slow increase in vacuum in the spark port 28 now permits the higher pressure in chamber 58 to seat the check valve 64 and provide continued advance at a delayed rate because of plugs 76. For each vacuum level of an engine, of course, there is a corresponding desirable engine spark timing setting that is best for the particular engine to provide the best performance.

If the vehicle throttle valve 26 now were permitted to return towards or to its idle speed position, from the rapid acceleration position previously attained, the vehicle then begins driving the engine, and the spark port vacuum immediately decays to a lower value that normally will be a higher absolute pressure than previous and higher than in the servo chamber 48. This immediately pops off the seated check valve 64 and permits a quick equalization of the vacuum servo chamber 48 pressure to that of the spark port pressure level to reduce the advance setting of the distributor to a lower engine operating setting. Once the pressure levels are equalized, the check valve or flapper valve 64 again will seat.

From the above, therefore, it will be seen that the invention provides an engine spark timing control that immediately and automatically provides the desired spark timing setting for engine performance, and yet reduces the output of undesirable exhaust pollutants by delaying normal advance timing during gradual part throttle engine accelerating conditions of operation.

The sintered discs have the flow advantages of permitting a random flow path due to particle arrangement, controlled porosity to volume ratio, the finished part can contain up to 50 percent or more interconnecting voids, and precise control of the air flow rate through each disc can be had merely by variations in base metal particle size. The described method of making the discs provides the advantages of controlled density, excellent corrosion and temperature resistance, and uniformity from piece to piece and lot to lot.

We claim:

1. A spark timing control system comprising, an engine carburetor having an induction passage containing a spark port located above the idle speed position of a throttle valve controlling flow through the passage and subject to the depression in the carburetor as a function of the movement of the throttle valve from its idle speed position, an engine distributor having a breaker plate pivotally movable in opposite directions to advance and retard the spark timing, vacuum controlled servo means connected to said breaker plate for moving the same, and slow-fast flow rate control means between said spark port and servo means to control the rate of change of application of vacuum from said spark port to said servo means, said control means including faster flow rate means operable in response to a change in the depression at said spark port to a lesser depression than at said servo means to quickly equalize the pressure level at said servo means to that at the spark port, and slower flow rate means operable in response to a change in the depression at said spark port to a greater depression than at the servo means to delay the equalization of the pressure level at the servo means to that at the spark port to delay the spark timing change, said control means including a conduit means connecting said spark port to said servo means and containing said slower flow rate means, the latter comprising sintered metal flow restricting plug means consisting of a multitude of members secured together in a manner providing flow spaces of a controlled area therebetween to provide a controlled delay in pressure change to said servo means.

2. A system as in claim 1, said conduit having a bypass branch around said flow restricting means containing a one-way check valve constituting said faster flow rate means.

3. A system as in claim 1, said members comprising balls of predetermined diameter fused together to provide the flow spaces between.

4. A system as in claim 1, said members comprising free shaped bent plate members fused together to provide voids therebetween that are interconnected to form said passages.

References Cited

UNITED STATES PATENTS 2,650,581   9/1953   Short et al. _____ 123—117.1

LAURENCE M. GOODRIDGE, Primary Examiner